United States Patent
Inoue

(10) Patent No.: US 7,090,895 B2
(45) Date of Patent: Aug. 15, 2006

(54) FLAME RETARDANT EPOXY RESIN COMPOSITION, SEMICONDUCTOR ENCAPSULATING MATERIAL USING SAME, AND RESIN ENCAPSULATED SEMICONDUCTOR DEVICE

(75) Inventor: Yoshifumi Inoue, Annaka (JP)

(73) Assignee: Shin-Etsu Chemical Co., Ltd., Tokyo (JP)

( * ) Notice: Subject to any disclaimer, the term of this patent is extended or adjusted under 35 U.S.C. 154(b) by 97 days.

(21) Appl. No.: 10/625,512

(22) Filed: Jul. 24, 2003

(65) Prior Publication Data

US 2004/0152804 A1    Aug. 5, 2004

(30) Foreign Application Priority Data

Aug. 9, 2002   (JP)  ............................. 2002-232654

(51) Int. Cl.
*H01L 23/29*    (2006.01)
*B05D 3/02*     (2006.01)
*C08L 63/00*    (2006.01)

(52) U.S. Cl. ...................... 427/386; 257/793; 257/796; 523/400; 523/461; 525/396; 525/523

(58) Field of Classification Search ................. 523/400, 523/461; 525/396, 523
See application file for complete search history.

(56) References Cited

U.S. PATENT DOCUMENTS

| | | | | |
|---|---|---|---|---|
| 5,019,605 A | * | 5/1991 | Jannic | 523/219 |
| 5,271,612 A | * | 12/1993 | Yada et al. | 267/158 |
| 5,274,006 A | * | 12/1993 | Kagoshima et al. | 521/85 |
| 5,453,453 A | * | 9/1995 | Lamon et al. | 521/54 |
| 5,996,167 A | * | 12/1999 | Close | 15/230.12 |
| 6,376,564 B1 | * | 4/2002 | Harrison | 521/54 |
| 6,403,668 B1 | * | 6/2002 | Yoshino | 521/178 |
| 6,846,559 B1 | * | 1/2005 | Czaplicki et al. | 428/355 EP |
| 2003/0001140 A1 | * | 1/2003 | Starkey | 252/301.35 |

FOREIGN PATENT DOCUMENTS

JP    63-273652    11/1988

* cited by examiner

*Primary Examiner*—Randy Gulakowski
(74) *Attorney, Agent, or Firm*—Oblon, Spivak, McClelland, Maier & Neustadt, P.C.

(57) ABSTRACT

An epoxy resin composition is provided, which includes (A) an epoxy resin with at least 2 epoxy groups within each molecule, (B) a curing agent, and (C) a foaming agent. This composition displays excellent flame retardancy and reliability and is suitable for use as a semiconductor encapsulating material.

16 Claims, No Drawings

FLAME RETARDANT EPOXY RESIN COMPOSITION, SEMICONDUCTOR ENCAPSULATING MATERIAL USING SAME, AND RESIN ENCAPSULATED SEMICONDUCTOR DEVICE

BACKGROUND OF THE INVENTION

1. Field of the Invention

The present invention relates to an epoxy resin composition suitable for use as a semiconductor encapsulating material, which displays excellent resistance to high temperature, flame retardancy and moisture resistance, and moreover does not use conventional flame retardants such as antimony compounds and halogenated epoxy resins.

2. Description of the Prior Art

In the field of semiconductor devices, resin encapsulated devices such as diodes, transistors, ICs, LSIs and ultra LSIs are common, and because epoxy resins offer superior levels of moldability, adhesion, electrical characteristics, mechanical characteristics and moisture resistance when compared with other thermosetting resins, the encapsulating of semiconductor devices with epoxy resin compositions is widespread.

Conventionally, in order to ensure that such epoxy resin compositions meet the UL-94 V-0 flame retardancy specifications, a brominated epoxy resin and antimony trioxide are typically combined and added to the composition as flame retardants. This combination of a brominated epoxy resin and antimony trioxide provides a gas phase radical trap and a powerful air blocking effect, and as a result, produces a strong flame retardancy effect.

However, brominated epoxy resins generate toxic gas on combustion, and antimony trioxide also has an associated powder toxicity, and consequently if the effect on both people and the environment is considered, then naturally it is desirable that a resin composition comprises neither of these flame retardants.

With this in mind, the use of hydroxides such as $Al(OH)_3$ and $Mg(OH)_2$, and phosphorus based flame retardants such as red phosphorus instead of brominated epoxy resins or antimony trioxide is currently being investigated. However, when any of the proposed compounds is actually used, a variety of problems arise such as a deterioration in curability during molding, or a deterioration in moisture resistance, and none of the proposed compounds has been able to satisfy the levels of reliability required for semiconductor devices, meaning that at present, no compounds are put into practice.

SUMMARY OF THE INVENTION

The present invention takes the above circumstances into consideration, with an object of providing an epoxy resin composition suitable for use as a semiconductor encapsulating material, which displays excellent flame retardancy and reliability, without using halogenated epoxy resins, and particularly brominated compounds such as brominated epoxy resins, or antimony compounds such as antimony trioxide, as well as providing a semiconductor encapsulating material formed therefrom.

The inventors of the present invention discovered that by adding a foaming agent to an epoxy resin composition, the flame retardancy could be improved markedly without affecting the reliability of the composition as a semiconductor encapsulating material, and were hence able to complete the present invention.

In other words, in order to achieve the above object, the present invention provides a flame retardant epoxy resin composition comprising (A) a halogen-free epoxy resin with at least 2 epoxy groups within each molecule, (B) a curing agent, and (C) a foaming agent, and also provides a semiconductor encapsulating material formed from such a flame retardant epoxy resin composition and further comprising (D) a filler.

DETAILED DESCRIPTION OF THE PREFERRED EMBODIMENTS

As follows is a more detailed description of the present invention.

[Component (A)]

As the epoxy resin of the component (A) of the present invention, which contains at least 2 epoxy groups within each molecule, can be utilized conventionally used epoxy resins, and specific examples include bisphenol A type epoxy resins, bisphenol F type epoxy resins, bisphenol S type epoxy resins, phenol novolak type epoxy resins, cresol novolak type epoxy resins, naphthalene type epoxy resins, biphenyl type epoxy resins, as well as N-glycidyl compounds derived from an aromatic amine and a heterocyclic nitrogen base, such as N,N-diglycidylaniline, triglycidyl isocyanurate, and N,N,N',N'-tetraglycidyl-bis(p-aminophenyl)-methane, although the epoxy resin is not restricted to those listed above. These epoxy resins may be used singularly, or in combinations of two or more resins.

As is evident from the object of the present invention described above, the component (A) excludes the use of halogenated epoxy resins such as brominated bisphenol A epoxy resins and brominated novolak epoxy resins. However in the production of epoxy resins, epichlorohydrin is typically used as a raw material, and removing all chlorine contamination of the epoxy resin arising from the epichlorohydrin is extremely difficult. However, the degree of contamination is of a known level, and the level of hydrolysable chlorine is, at most, of the order of several hundred ppm. Accordingly, an epoxy resin of the component (A) of the present invention can be considered as essentially halogen free.

[Component (B)]

A curing agent of the component (B) used in the present invention may utilize any conventionally known epoxy resin curing agent. Specific examples of the curing agent include straight chain aliphatic diamines of $C_2$ to $C_{20}$ such as ethylenediamine, trimethylenediamine, tetramethylenediamine and hexamethylenediamine; straight chain aliphatic polyvalent amines such as diethylenetriamine, triethylenetetramine and tetramethylenepentamine; alicyclic and aromatic amines such as metaphenylenediamine, paraphenylenediamine, metaxylylenediamine, paraxylylenediamine, 4,4'-diaminodiphenylmethane, 1,3-bis(4-aminophenyl)propane, 4,4'-diaminodiphenyl ether, 4,4'-diaminodiphenyl sulfone, 4,4'-diaminobicyclohexane, bis(4-aminophenyl)methane, 1,5-diaminonaphthalene and 1,1-bis(4-aminophenyl)cyclohexane; dicyanamide; resol type phenol resins such as aniline modified resol resins and dimethyl ether resol resins; novolak type phenol resins such as phenol novolak resins, cresol novolak resins, tert-butylphenol novolak resins and nonylphenol novolak resins; phenol resin such as phenol aralkyl resins; polyoxystyrenes such as polyparaoxystyrene; and acid anhydrides such as phthalic anhydride, hexahydrophthalic anhydride, dodecylsuccinic anhydride, pyromellitic anhydride and chlorendic anhydride, although this is in no way a restrictive list. These compounds may be used singularly or in combinations of two or more compounds.

Examples of the phenol aralkyl resins include compounds of the structure shown below.

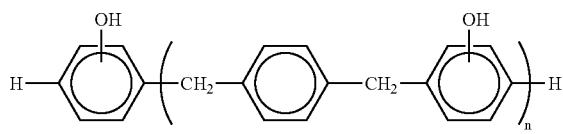

In the case of an epoxy resin curing agent for a semiconductor encapsulating material, then in terms of moisture resistance and reliability, compounds or resins with at least 2 phenolic hydroxyl groups within each molecule are preferred, and specific examples include novolak type phenol resins such as phenol novolak resins, cresol novolak resins, tert-butylphenol novolak resins and nonylphenol novolak resins, resol type phenol resins, polyoxystyrenes such as polyparaoxystyrene, and phenol aralkyl resins.

There are no particular restrictions on the quantity of the component (B), which will vary depending on the varieties of the epoxy resin and the curing agent, although typically a quantity is added which produces a ratio of the hydroxyl group equivalence of the component (B) relative to the epoxy equivalence of the epoxy resin of the component (A) which falls within a range from approximately 0.5 to 2.0.

[Component (C)]

A foaming agent of the component (C) used in the present invention is a component for imparting flame retardancy to an epoxy resin composition of the present invention, and is an essential component in characterizing a flame retardant epoxy resin composition of the present invention.

The foaming agent is a material which decomposes readily at combustion temperatures, generating a gas, and preferably a non-flammable gas such as nitrogen gas or carbon dioxide gas, during the combustion process. This gas generation causes the generation of foaming or a porous structure, that is the generation of a multitude of cavities, within the resin which has softened under the combustion temperature, thereby generating a thermal insulation effect, and by also providing an oxygen blocking effect through the formation of foam or a porous layer at the surface of the resin, an epoxy resin composition with excellent flame retardancy at the V-0 level of the UL-94 standards can be achieved, thereby achieving the object of the present invention. Furthermore, provided the generated gas is a non-flammable gas, the oxygen blocking effect described above can be further enhanced.

The decomposition temperature of the foaming agent is preferably at least 180° C., with values of 200° C. or higher being even more preferred, and values of 250° C. or higher being the most desirable. If the decomposition temperature of the foaming agent is too low, then because the temperature required for the molding of an epoxy resin is reached at a temperature lower than approximately 180° C., foaming may occur during the production or molding of the semiconductor encapsulating material, causing a variety of problems.

Preferred is a foaming agent with a quantity of gas generated by the decomposition being preferably at least 40 ml/g, with values of 80 ml/g or higher being even more preferred, and values of 150 ml/g or higher being the most desirable. If the quantity of gas generated is too low then the flame retardant effect imparted by the foaming agent diminishes.

Examples of the foaming agent of the component (C) in the present invention include organic compounds such as azodicarbonamide (decomposition temperature: 208° C. (all values below also refer to decomposition temperature)), azobistetrazole diaminoguanidine (220° C.), azobistetrazole guanidine (240° C.), 5-phenyltetrazole (250° C.), bistetrazole guanidine (350° C.), bistetrazole piperazine (360° C.), bistetrazole diammonium (350° C.), N,N'-dinitrosopentamethylene tetramine (205° C.) and hydrazodicarbonamide (245° C.), although this is in no way a restrictive list.

These foaming agents may be used singularly or in combinations of two or more compounds.

The quantity of the component (C) in the present invention must be sufficient to ensure an epoxy resin composition which passes the V-0 level of the UL standards. The quantity is typically within a range from 0.01 to 50% by weight, and preferably from 0.5 to 20% by weight, and even more preferably from 0.5 to 10% by weight, of a flame retardant epoxy resin composition of the present invention.

[Features of a Flame Retardant Resin Composition of the Present Invention]

As described above, a flame retardant epoxy resin composition of the present invention comprises as essential components: (A) an essentially halogen free epoxy resin with at least 2 epoxy groups within each molecule, (B) a curing agent, and (C) a foaming agent. Although the composition contains no added flame retardants based on halogenated compounds, antimony systems or phosphorus systems, it is capable of imparting a high degree of flame retardancy with no deterioration in product characteristics. As a result, it is ideal for use not only as an encapsulating material for semiconductor elements, and an encapsulating material for electrical and electronic components, but also within those fields in which epoxy resins have conventionally been used, including coating materials, insulation materials, and laminates such as metal clad laminates, where the characteristics of the composition such as superior resistance to high temperature, good curability and good moisture resistance can be well utilized.

[Semiconductor Encapsulating Material]

In those cases in which a composition of the present invention is used as a semiconductor encapsulating material, the composition should preferably also comprise a filler.

Specific examples of suitable fillers include silica powders such as fused silica, alumina, talc, calcium carbonate, clay and mica, and typically the particle size should be no more than 20 µm, and preferably no more than 5 µm, and most preferably no more than 1 µm. If the particle size of the filler is overly large then the possibility of the electrode or wire bonding being cut during the semiconductor encapsulating process increases undesirably. The fillers described above may be used singularly, or in combinations of two or more materials. The quantity of the filler is typically within a range from 70 to 95% by weight, and preferably from 80 to 92% by weight of the entire weight of the semiconductor encapsulating material including the filler.

In addition to the fillers described above, other additives typically used within semiconductor encapsulating materials, including release agents such as natural waxes, synthetic waxes, metal oxides, acid amides and esters of straight chain aliphatic acids, and paraffins; coloring agents such as carbon black and red iron oxide; as well as various curing accelerators and coupling agents, may also be added to a semiconductor encapsulating material of the present invention.

Furthermore, by also using other known flame retardants including metal hydroxides such as magnesium hydroxide and aluminum hydroxide, or zinc carbonate, the flame retardant effect of the present invention can be enhanced even further.

A semiconductor encapsulating material of the present invention is produced by selecting and preparing the components (A) to (C), the filler (D), and where necessary any other additives, in a desired composition ratio, mixing all the components together with a mixer or the like to generate a uniform mixture, conducting a kneading process using a heat roller or a co-kneader or the like, subsequently cooling and solidifying the mixture, and then crushing the mixed solid to a suitable particle size. Furthermore, in order to further improve the dispersion, the epoxy resin of the component (A) and the curing agent of the component (B) may be subjected to molten mixing prior to use.

The product semiconductor encapsulating material can be ideally applied to the encapsulating of a semiconductor element using transfer molding or injection molding or the like. In this manner, a resin encapsulated semiconductor device comprising a semiconductor device and a cured encapsulating material which encapsulates the semiconductor device can be obtained. Examples of semiconductor devices suitable for encapsulating include transistors, ICs, LSIs, ultra LSIs and diodes.

EXAMPLES

As follows is a more detailed description of the present invention using Examples, although the present invention is in no way restricted to the Examples.

First is a description of the foaming agents of the component (C) used in the Examples. In Examples 1 to 3, three different foaming agents are used, and the name and characteristics of each of these is shown below in Table 1.

TABLE 1

| Foaming agent | Decomposition temperature (° C.) | Quantity of gas generated (ml/g) | Particle size (μm) |
|---|---|---|---|
| Celltetra BHT-P5T | 265 | 180 | 1 |
| Vinyfor AC#3C | 208 | 200 | 3 |
| Excellar P#30 | 200 | 145 | 20 |

Celltetra BHT-P5T (a brand name, manufactured by Eiwa Chemical Co., Ltd.): 5-phenyltetrazole
Vinyfor AC#3C (a brand name, manufactured by Eiwa Chemical Co., Ltd.): azodicarbonamide
Excellar P#30 (a brand name, manufactured by Eiwa Chemical Co., Ltd.): N,N'-dinitrosopentamethylene tetramine/azodicarbonamide
(The particle sizes were adjusted by recrystallization, sieving, and compression.)

Example 1

(D) 82 parts by weight of fused silica, (C) 2.8 parts by weight of Celltetra BHT-P5T, (A) 7.6 parts by weight of a biphenyl type epoxy resin (YX-4000H, manufactured by Yuka Shell Epoxy Co., Ltd., epoxy equivalence: 195 g/eq), (B) 6.8 parts by weight of a phenol aralkyl resin (XL-225, manufactured by Mitsui Chemicals, Inc., hydroxyl group equivalence: 175 g/eq), 0.3 parts by weight of natural carnauba wax, 0.2 parts by weight of carbon black, and 0.3 parts by weight of a silane coupling agent KBM-403 (a brand name, manufactured by Shin-Etsu Chemical Co., Ltd.) were combined, kneaded together using heat rollers, cooled, and subsequently crushed to yield a semiconductor encapsulating molding material.

The fluidity and curability of the molding material, and the flame retardancy and reliability of the cured product thereof were measured. The evaluation methods employed are described below. Furthermore, the evaluation results for this Example 1 are shown in Table 2.

(1) Fluidity

Using a die as specified in the EMMI standards, a transfer molding apparatus was used to measure the spiral flow (cm) under conditions including a die temperature of 175° C. and an injection pressure of 6.86 MPa (70 kgf/cm$^2$), and this result was used to evaluate the fluidity, with larger measurement results indicating better fluidity.

(2) Curability

The curability was evaluated on the basis of the Barcol hardness of a molded product produced using a transfer molding apparatus under conditions including a die temperature of 175° C. and a curing time of 120 seconds.

(3) Flame Retardancy

Flame retardancy was evaluated in accordance with the UL94 standards using a vertical test method. A flame retardancy measurement specimen of thickness 1.6 mm was prepared by molding for 3 minutes at a die temperature of 175° C., and subsequent post curing for 8 hours at 175° C.

(4) Reliability (Resistance to High Temperature, Moisture Resistance)

Using the same molding conditions as described for the flame retardancy measurement specimen, monitor ICs (16 pDIP) with a mounted aluminum dummy element were subjected to molding. These specimens were then left to stand in an atmosphere of 121° C. and 100% relative humidity for 1000 hours, and the reliability was subsequently evaluated in terms of the number of defective specimens (chip shift or the like).

Examples 2, 3

Using the same method as Example 1, molding materials were prepared using the materials and relative compositions shown in Table 2, and these materials were then evaluated in the same manner as Example 1. The evaluation results are shown in Table 2.

Comparative Example

With the exception of not using the foaming agent used in Example 3, and increasing the quantity of the fused silica by an amount of the foaming agent in Example 3, a molding material was prepared in the same manner as Example 3 and subsequently evaluated. The evaluation results are shown in Table 2.

TABLE 2

| | Example 1 | Example 2 | Example 3 | Comparative Example |
|---|---|---|---|---|
| Composition (parts by weight) | | | | |
| YX4000H | 7.6 | 7.6 | 7.6 | 7.6 |
| XL-225 | 6.8 | 6.8 | 6.8 | 6.8 |
| Fused silica | 82 | 83.4 | 84.3 | 84.8 |
| Celltetra BHT-P5T | 2.8 | — | — | — |

TABLE 2-continued

| | Example 1 | Example 2 | Example 3 | Comparative Example |
|---|---|---|---|---|
| Vinyfor_AC#3C | — | 1.4 | — | — |
| Excellar_P#30 | — | — | 0.5 | — |
| Natural carnauba wax | 0.3 | 0.3 | 0.3 | 0.3 |
| Carbon | 0.2 | 0.2 | 0.2 | 0.2 |
| KBM-403 | 0.3 | 0.3 | 0.3 | 0.3 |
| Evaluation | | | | |
| Spiral flow (cm) | 87 | 93 | 92 | 90 |
| Curability (Barcol hardness) | 70 | 68 | 67 | 70 |
| Flame retardancy (UL94) | V-0 | V-0 | V-0 | fail |
| Reliability (defects/ sample) | 0/20 | 0/20 | 0/20 | 0/20 |

A flame retardant epoxy resin composition of the present invention is capable of providing good flame retardancy even without the use of conventional flame retardants such as brominated epoxy resins and antimony trioxide, and because the composition suffers no environmental or human toxicity problems, and also provides excellent resistance to high temperatures and humidity, it is particularly useful as a semiconductor encapsulating material. Furthermore, a semiconductor encapsulating material formed by adding a filler to the aforementioned flame retardant epoxy resin composition offers not only the above characteristics, but also good reliability, enabling the production of high quantity products.

What is claimed is:

1. A process for producing a resin encapsulated semiconductor device comprising a semiconductor device and a cured product of a flame retardant epoxy resin composition, comprising the steps of:

molding on said semiconductor device a flame retardant epoxy resin composition comprising (A) a halogen-free epoxy resin with at least 2 epoxy groups within each molecule, (B) a curing agent having at least two phenolic hydroxyl groups within the curing molecule, and (C) a foaming agent which decomposes at a temperature of at least 180° C.; and curing the molded composition to form said cured product to encapsulate the semiconductor device within the cured product, wherein:

(i) the quantity of gas that is generated from said foaming agent (C) is at least 40 ml/g, (ii) said curing agent (B) is present in a quantity which produces a ratio of the hydroxyl group equivalence of component (B) relative to the epoxy equivalence of the epoxy resin of component (A) which falls within the range of approximately 0.5 to 2.0, (iii) said foaming agent (C) is present in a quantity ranging from 0.01 to 50% by weight based on the whole composition, and the temperature for molding and curing the composition is lower than the decomposition temperature of said foaming agent (C).

2. The process according to claim 1, wherein the epoxy resin of the component (A) comprises a bisphenol A type epoxy resin, a bisphenol F type epoxy resin, a bisphenol S type epoxy resin, a phenol novolak type epoxy resin, a cresol novolak type epoxy resin, a naphthalene type epoxy resin, a biphenyl type epoxy resin, an N-glycidyl compound derived from an aromatic amine and a heterocyclic nitrogen base, or a combination of two or more thereof.

3. The composition according to claim 1, wherein the curing agent (B) comprises a phenol aralkyl resin having a structure represented by the formula:

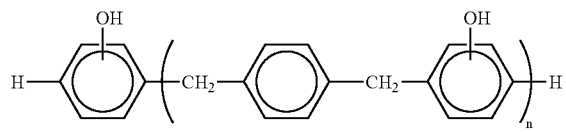

wherein n is a number that provides a hydroxyl group equivalence of 175 g/eq.

4. The process according to claim 1, wherein said compound with at least two phenolic hydroxyl groups is a novolak type phenol resin, a resol type phenol resin, a polyoxystyrene, a phenol aralkyl resin, or a combination of two or more.

5. The process according to claim 1, wherein the foaming agent (C) decomposes at a temperature of at least 180° C.

6. The process according to claim 1, wherein the foaming agent (C) decomposes at a temperature of at least 200° C.

7. The process according to claim 6, wherein the foaming agent (C) decomposes at a temperature of at least 250° C.

8. The process according to claim 6, wherein said temperature for molding and curing the composition is lower than 180° C.

9. The process according to claim 1, wherein a quantity of gas that is generated from said foaming agent (C) is at least 80 ml/g.

10. The process according to claim 9, wherein a quantity of gas that is generated from said foaming agent (C) is at least 150 ml/g.

11. The process according to claim 1, wherein said foaming agent (C) comprises azodicarbonamide, azobistetrazole diaminoguanidine, azobistetrazole guanidine, 5-phenyltetrazole, bistetrazole guanidine, bistetrazole piperazine, bistetrazole diammonium, N,N'-dinitrosopentamethylene tetramine, hydrazodicarbonamide, or a combination of two or more thereof.

12. The process according to claim 1, further comprising (D) a filler.

13. The process according to claim 12, wherein said filler (D) comprises a silica powder, alumina, talc, calcium carbonate, clay, mica or a combination of two or more; the particle size of said filler (D) is no more than 20 µm; and said filler (D) is present in a quantity from 70 to 95% by weight based on the whole composition.

14. The process according to claim 13, wherein said silica powder is fused silica.

15. A resin encapsulated semiconductor device produced by the process according to claim 1 encapsulating said semiconductor device.

16. A process for producing a resin encapsulated semiconductor device comprising a semiconductor device and a cured product of a semiconductor encapsulating material, comprising the steps of:

molding on said semiconductor device a semiconductor encapsulating material comprising a composition comprising (A) a halogen-free epoxy resin with at least 2 epoxy groups within each molecule, (B) a curing agent having at least two phenolic hydroxyl groups within the curing molecule, and (C) a foaming agent which decomposes at a temperature of at least 180° C.; and curing the molded composition to form said cured product to encapsulate the semiconductor device within the cured product, wherein:

(i) the quantity of gas that is generated from said foaming agent (C) is at least 40 ml/g, (ii) said curing agent (B) is present in a quantity which produces a ratio of the hydroxyl group equivalence of component (B) relative to the epoxy equivalence of the epoxy resin of component (A) which falls within the range of approximately 0.5 to 2.0, (iii) said foaming agent (C) is present in a quantity ranging from 0.01 to 50% by weight based on the whole composition, and the temperature for molding and curing the composition is lower than the decomposition temperature of said foaming agent (C).

* * * * *